United States Patent [19]

Izumi et al.

[11] 4,371,590
[45] Feb. 1, 1983

[54] MAGNETIC RECORDING MEDIUM WITH STEPWISE ORIENTATION OF DEPOSITED METALLIC PARTICLES

[75] Inventors: Toshiaki Izumi; Seitoku Saito; Fumio Maruta; Minoru Kameya, all of Tokyo, Japan

[73] Assignee: TDK Electronics Co., Ltd., Tokyo, Japan

[21] Appl. No.: 213,357

[22] Filed: Dec. 5, 1980

[30] Foreign Application Priority Data

Mar. 25, 1980 [JP] Japan .................................. 55-38585

[51] Int. Cl.³ .......................... B32B 15/18; H01F 1/16
[52] U.S. Cl. .................................. 428/555; 360/134; 360/135; 427/131; 427/132; 428/551; 428/611; 428/928

[58] Field of Search ................. 427/48, 130, 131, 132, 427/128; 365/171; 360/131, 134, 135; 428/611, 546, 548, 555, 551, 928

[56] References Cited

U.S. PATENT DOCUMENTS

| | | | |
|---|---|---|---|
| 3,117,065 | 1/1964 | Wootten | 427/48 X |
| 3,342,633 | 9/1967 | Bate et al. | 427/131 X |
| 4,153,920 | 5/1979 | Shirahata et al. | 427/131 X |
| 4,265,931 | 5/1981 | Tamai et al. | 427/48 |

*Primary Examiner*—Thurman K. Page
*Attorney, Agent, or Firm*—Oblon, Fisher, Spivak, McClelland & Maier

[57] ABSTRACT

A magnetic recording medium having multi-layer structure of two or more thin metallic layers on a substrate. The orientations of metallic particles are different for each of said thin metallic layers.

5 Claims, 4 Drawing Figures

MAGNETIC RECORDING MEDIUM WITH STEPWISE ORIENTATION OF DEPOSITED METALLIC PARTICLES

BACKGROUND OF THE INVENTION

1. Field of the Invention

The present invention relates to a thin metallic layer type magnetic recording medium.

2. Description of the Prior Art

The conventional magnetic recording medium has been usually prepared by coating a magnetic composition comprising a binder and a magnetic powder, on a substrate such as a polyester film.

In view of the recent development of magnetic recording apparatuses such as widespread of home VTR and high functional audio cassette, it has been required to attain high density recording over the high density attained by the conventional magnetic recording medium.

A thin metallic layer type magnetic recording medium has been proposed to attain the requirement for the high density magnetic recording. The thin metalic layer type magnetic recording media have been prepared by forming a thin metallic layer on a substrate by forming metallic particles made of a metal or alloy of iron group element or an alloy thereof with the third element by a vacuum evaporation, sputtering, ion-plating, ion beam evaporation or electrochemical method and depositing the metallic particles on the non-magnetic substrate.

It has been known that the thin metallic layer having high coercive force can be formed by depositing the metallic particles (1) on the substrate (2) from the direction having large tilt angle $\theta$ as shown in FIG. 1 in the step of forming the thin metal layer. In FIG. 1, the normal line to the surface of the substrate (2) is referred as by the reference (3).

Thus, as the common magnetic recording media, it is not always required to have high coercive force in view of the function of the recording systems and it is possible to give certain limited coercive force. In order to satisfy the requirement, it is necessary to give large residual magnetic flux in certain range of the coercive force.

SUMMARY OF THE INVENTION

It is an object of the present invention to provide a magnetic recording medium having multi-layer structure of thin metallic layers which has large residual magnetic flux in certain range of a coercive force.

The foregoing and other objects of the present invention have been attained by providing a magnetic recording medium having multi-layer structure of two or more thin metallic layers on a substrate wherein orientations of metallic particles are different for each of the thin metallic layers. The angles of the orientations of the metallic particles to the normal line of the substrate are smaller for the outer layer departed from the substrate.

DETAILED DESCRIPTION OF THE PREFERRED EMBODIMENTS

Figure 1:
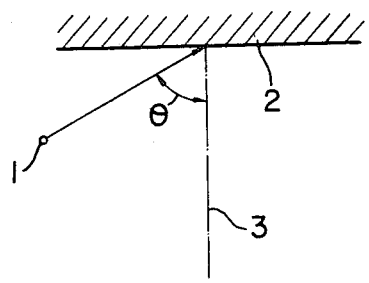
FIG. 1 is a schematic view showing the relation of the tilt angles of metallic particles to the substrate.
Figure 2:
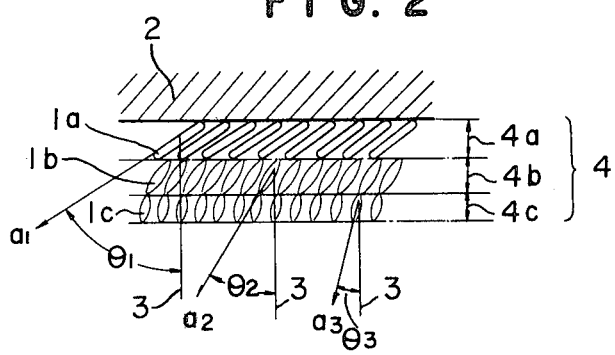
FIG. 2 is a schematic view showing the structure of the magnetic recording medium of the present invention.

FIG. 2 shows one embodiment of the magnetic recording medium according to the present invention, thin metallic layers (4) having three layer structure of the layers (4a), (4b), (4c) are coated on the substrate (2) made of a non-magnetic material such as polyester. The metallic particles (1a), (1b), (1c) for the thin metallic layers (4a), (4b), (4c) are deposited to give different angles $\theta_1$, $\theta_2$, $\theta_3$ of the acicular direction ($a_1$), ($a_2$), ($a_3$) of the metallic particles (1a), (1b), (1c) to the normal line (3) of the substrate (2) so as to be smaller angle for the outer layers departed from the substrate (2). That is, the metallic particles (1a), (1b), (1c) are deposited to give the angles of $\theta_1 > \theta_2 > \theta_3$....

In accordance with the formation of the multi-layer structure of the thin metallic layer, the residual magnetic flux may be increased in substantially proportional to the number of the thin metallic layers under a constant coercive force.

When the multi-layer structure is given at the same tilt angle ($\theta$) for the thin metallic layers, the coercive force is increased depending upon the increase of the number of the thin metallic layers. Thus, the metallic particles in different layers do not contribute to the magnetic characteristic in this structure, but the apparent length of the metallic particles may be extended to give larger shape anisotropy by arranging the metallic particles in the different layers in one direction.

On the other hand, in the thin metallic layers of the present invention, the orientations of the metallic particles (1a), (1b), (1c) in the different layers (4a), (4b), (4c) are changed stepwise whereby the increase of the coercive forces depending upon the shape anisotropy are counterbalanced with the decrease of the coercive force caused by the variation of the angles $\theta_1$, $\theta_2$, $\theta_3$ as $\theta_1 > \theta_2 > \theta_3$ so as to maintain the constant coercive force. The residual magnetic flux is increased in substantially proportional to the number of the thin metallic layers.

The magnetic recording medium such as tape and disc are prepared by the conventional manners using the substrate coated with the thin metallic layers in the special multi-layer structure. The detail of the preparation is disclosed in many prior arts and accordingly the description of the detail is not repeated.

The angle $\theta_1$ is usually different for at least 2 degree from the angle $\theta_2$ and for at least 5 degree from the angle $\theta_3$ as the most outer layer.

The present invention will be further illustrated by certain examples and references which are provided for purposes of illustration only and are not intended to be limiting the present invention.

EXAMPLE 1

A cobalt-nickel alloy was prepared by combining cobalt and nickel at a ratio of 4:1 by weight. The alloy was deposited on a substrate of a polyester film having a thickness of 12$\mu$ by a vacuum evaporation under a reduced pressure of $3-5 \times 10^{-5}$ torr at a rate of 1000 Å per minute at a running speed of the polyester film of 40 cm/min. The polyester film was exposed to the metal vapor for about 30 seconds. The tilt angle $\theta_1$ for the first layer was 80 degree and the tilt angle $\theta_2$ for the second layer was 70 degree and the tilt angle $\theta_3$ for the third layer was 65 degree. Each magnetic characteristic of the product in each stage was measured by VSM. The maximum magnetic field applied in the longitudinal direction was 5000 gauss.

EXAMPLE 2

A cobalt-nickel alloy having a ratio of Co to Ni of 7:3 was deposited on a substrate in the same condition as that of Example 1 to form the metal deposited layers and the magnetic characteristics of the product was measured.

Figure 3:
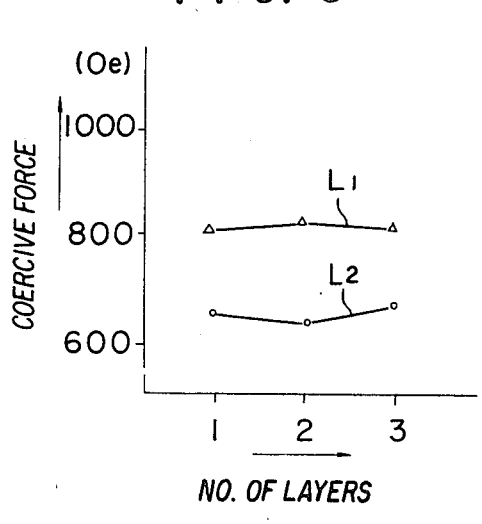
FIG. 3 is a graph showing the relation of coercive forces and number of metallic layers.
Figure 4:
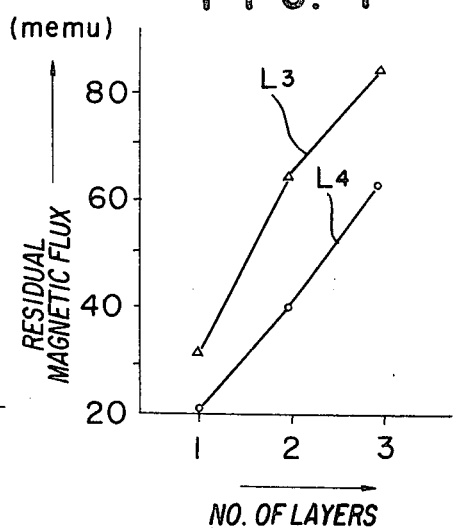
FIG. 4 is a graph shown the relation of residual magnetic fluxes and number of metallic layers.

The results of the magnetic characteristics for the products obtained in Examples 1 and 2 are shown in FIGS. 3 and 4. FIG. 3 shows the relation of the number of layers of thin metal layers and coercive forces. FIG. 4 shows the relation of the number of layers of the sample having a width of 3.81 mm and a length of 20 cm and residual magnetic fluxes.

The curves $L_1$ and $L_3$ in FIGS. 3 and 4 show the measured data in Example 1 and the curves $L_2$ and $L_4$ show the measured data in Example 2.

As shown in FIG. 3, the coercive force was kept in about 800 Oe (curve $L_1$) of about 640 Oe (curve $L_2$) even though the number of the thin metal layers is increased. On the other hand, as shown in FIG. 4, the residual magnetic flux was increased n substantially proportional to the number of the thin metal layers. In accordance with the present invention, the residual magnetic flux can be increased under preventing the increase of the coercive force whereby it is remarkably effective for imparting a desired magnetic characteristic.

The number of the thin metal layers is not limited to three layers but can be any multi-layers having two or more layers. The angles of the metallic particles to the normal direction are not limited to the angles in the examples.

As described above, in accordance with the present invention, the directions of the metallic particles for the thin metal layers are different in each of the layers, in the magnetic recording medium having the thin metal layers in the multi-layer structure having two or more layers on a substrate. Therefore, the magnetic recording medium having a desired magnetic characteristic can be obtained under preventing the increasing the coercive force but increasing the residual magnetic flux in the formation of the multi-layer structure.

We claim:

1. A magnetic recording medium comprising two or more thin metallic layers on a substrate, said layers having deposited thereon metallic particles whose angle of orientation varies stepwise between said layers to provide a substantially constant coercive force while residual magnetic flux increases in substantial proportion to the number of said thin metallic layers.

2. The magnetic recording medium according to claim 1 wherein the angles of orientations of said metallic particles to the normal line of said substrate are progressively smaller as the layers are away from said substrate.

3. The magnetic recording medium according to claim 1 or 2 wherein said metallic layers are formed by depositions of metallic particles from different direction for each layer.

4. The magnetic recording medium according to claim 1 wherein said metallic layer is made of a metal or alloy of the iron group element with or without a third element.

5. The magnetic recording medium according to claim 1 or 2 wherein the angle of orientation of said metallic particles to the normal line of said substrate for the first layer is different by at least 3 degrees from the angle of orientation of said metallic particles for the adjacent layer and by at least 5 degrees from the angle of orientation of said metallic particles for the outermost layer.

* * * * *